US011526798B2

(12) United States Patent
Pinel et al.

(10) Patent No.: US 11,526,798 B2
(45) Date of Patent: *Dec. 13, 2022

(54) PARKING AVAILABILITY PREDICTOR

(71) Applicant: INTERNATIONAL BUSINESS MACHINES CORPORATION, Armonk, NY (US)

(72) Inventors: Florian Pinel, New York, NY (US); Tova Roth, Woodmere, NY (US)

(73) Assignee: International Business Machines Corporation, Armonk, NY (US)

( * ) Notice: Subject to any disclaimer, the term of this patent is extended or adjusted under 35 U.S.C. 154(b) by 895 days.

This patent is subject to a terminal disclaimer.

(21) Appl. No.: 15/812,352

(22) Filed: Nov. 14, 2017

(65) Prior Publication Data

US 2019/0147368 A1    May 16, 2019

(51) Int. Cl.
    *G06N 20/00*    (2019.01)
    *G08G 1/14*    (2006.01)
    *G06N 5/02*    (2006.01)
    *G08G 1/01*    (2006.01)

(52) U.S. Cl.
    CPC ............ *G06N 20/00* (2019.01); *G06N 5/022* (2013.01); *G08G 1/0129* (2013.01); *G08G 1/14* (2013.01)

(58) Field of Classification Search
    CPC ...... G06N 20/00; G06N 5/022; G08G 1/0129; G08G 1/14
    See application file for complete search history.

(56) References Cited

U.S. PATENT DOCUMENTS

| | | | |
|---|---|---|---|
| 6,285,297 B1 | 9/2001 | Ball | |
| 6,340,935 B1 | 1/2002 | Hall | |
| 6,927,700 B1 | 8/2005 | Quinn | |
| 7,222,007 B2 * | 5/2007 | Xu | ........................ B60G 17/016 180/252 |
| 7,538,690 B1 | 5/2009 | Kaplan et al. | |

(Continued)

FOREIGN PATENT DOCUMENTS

| | | |
|---|---|---|
| JP | 04213575 A | 8/1992 |
| WO | 2016174670 A1 | 11/2016 |

(Continued)

OTHER PUBLICATIONS

Javier Cervantes-Villanueva, Daniel Carrillo-Zapata, Fernando Terroso-Saenz, Mercedes Valdes-Vela and Antonio F. Skarmeta. Vehicle Maneuver Detection with Accelerometer-Based Classification. 2016. Sensors (Year: 2016).*

(Continued)

*Primary Examiner* — David R Vincent
(74) *Attorney, Agent, or Firm* — Brandon L. Stephens

(57) ABSTRACT

Embodiments of the present invention disclose a method, a computer program product, and a computer system predicting parking availability. A computer identifies parking spaces and groups the parking spacing into parking locations. In addition, the computer distinguishes private parking spaces from public parking spaces, and trains a crowd forecast model for each of the parking locations. The computer further receives a destination and preferences, from which the computer creates a geofence based on the destination and preferences. The computer then predicts parking availability based on the crowd forecast models and refines the crowd forecast model.

13 Claims, 5 Drawing Sheets

(56) References Cited

U.S. PATENT DOCUMENTS

| | | | |
|---|---|---|---|
| 7,893,848 | B2 | 2/2011 | Chew |
| 8,063,797 | B1 | 11/2011 | Sonnabend et al. |
| 8,612,533 | B1 | 12/2013 | Harris et al. |
| 9,129,524 | B2 | 9/2015 | Delibaltov et al. |
| 9,171,461 | B1 | 10/2015 | Dabell |
| 9,200,921 | B2* | 12/2015 | Iwuchukwu ........ G01C 21/3685 |
| 2005/0206534 | A1 | 9/2005 | Yamane et al. |
| 2005/0280555 | A1 | 12/2005 | Warner, IV |
| 2006/0004511 | A1 | 1/2006 | Yoshikawa et al. |
| 2006/0267799 | A1 | 11/2006 | Mendelson |
| 2007/0208492 | A1 | 9/2007 | Downs et al. |
| 2012/0095812 | A1 | 4/2012 | Stefik et al. |
| 2012/0265434 | A1 | 10/2012 | Woodard et al. |
| 2014/0058711 | A1* | 2/2014 | Scofield ................. G06Q 10/04 703/6 |
| 2015/0009047 | A1* | 1/2015 | Ashkenazi ............. G08G 1/147 340/932.2 |
| 2015/0123818 | A1* | 5/2015 | Sellschopp ...... G08G 1/096816 340/932.2 |
| 2015/0256632 | A1 | 9/2015 | Harris et al. |
| 2015/0381380 | A1 | 12/2015 | Harris et al. |
| 2016/0140845 | A1 | 5/2016 | Agrawal et al. |
| 2016/0171546 | A1 | 6/2016 | Gartenberg et al. |
| 2016/0370963 | A1 | 12/2016 | Morschheuser |
| 2017/0025008 | A1 | 1/2017 | Gignac et al. |
| 2017/0032199 | A1 | 2/2017 | Wang et al. |
| 2017/0039661 | A1 | 2/2017 | Vanslette et al. |
| 2017/0053192 | A1 | 2/2017 | Ding et al. |
| 2017/0278023 | A1* | 9/2017 | Rosen ..................... G08G 1/148 |
| 2017/0355307 | A1* | 12/2017 | Ha ......................... G08G 1/143 |
| 2018/0225969 | A1* | 8/2018 | Baughman ........... G06Q 10/101 |
| 2019/0147368 | A1 | 5/2019 | Pinel |

FOREIGN PATENT DOCUMENTS

| | | | |
|---|---|---|---|
| WO | 2017192144 | A1 | 11/2017 |
| WO | WO-2017192144 | A1 * | 11/2017 ............. H04N 5/247 |

OTHER PUBLICATIONS

Bo Xu, Ouri Wolfson, Jie Yang, Leon Stenneth. Real-Time Street Parking Availability Estimation. 2013. IEEE (Year: 2013).*

Xiao Chen and Nianzu Liu. Smart Parking by Mobile Crowdsensing. 2016. International Journal of Smart Home (Year: 2016).*

Aggdata, "Complete data means quality information. Quality information means great decisions," https://www.aggdata.com/, Copyright 2017 AggData, Printed on Jul. 6, 2017, pp. 1-5.

Màrmol et al., "QuickSpot: a video analytics solution for on-street vacant parking spot detection," Multimed Tools Appl, Revised: May 31, 2016 / Accepted: Jul. 7, 2016, © Springer Science+BusinessMedia, New York, 2016, pp. 1-33.

Nandugudi et al., "PocketParker: Pocketsourcing Parking Lot Availability," UbiComp ' 14, Sep. 13-17, 2014, Seattle, WA, USA, Copyright 2014, ACM, pp. 1-11.

PRNewswire, "Anagog's Mobility Status SDK to Help Pango Drivers Find the Nearest Available Parking Spot," News provided by Anagog, Sep. 19, 2016, http://www.prnewswire.com/news-releases/anagogs-mobility-status-sdk-to-help-pango-drivers-find-the-nearest-available-parking-spot-593963571.html, Printed on Jul. 6, 2017, pp. 1-3.

SmoothParking, "Street Parking—street parking and garages in NYC," https://smoothparking.com/, Copyright 2017, SmoothParking Inc., Printed on Jul. 6, 2017, pp. 1-1.

Urman et al., "Unsupervised Detection of Available Parking Spots," 2016 ICSEE International Conference on the Science of Electrical Engineering, IEEE 2016, added to IEEE Xplore on Jan. 5, 2017, pp. 1-5.

Mell et al., "The NIST Definition of Cloud Computing," National Institute of Standards and Technology, U.S. Department of Commerce, Special Publication 800-145, Sep. 2011, pp. 1-7.

Brandom, "Google Search can now tell you when a store gets crowded," The Verge, https://www.theverge.com/2015/7/28/9059923/google-search-crowds-lines-data, Jul. 28, 2015, Printed on Jul. 6, 2017, pp. 1-4.

Dale, "Placemeter wants to know how crowded a place is before you go," Technically Media, https://technical.ly/brooklyn/2014/02/24/placemeter/, Feb. 24, 2014, Copyright 2017 Technically Media Inc., Printed on Jul. 6, 2017, pp. 1-5.

Olanoff, "FoursCrowd shows you crowded foursquare locations to flock to or stay away from," The Next Web, https://thenextweb.com/apps/2012/01/04/fourscrowd-shows-you-crowded-foursquare-locations-to-flock-to-or-stay-away-from/#.tnw_EDSTsD6P, Jan. 4, 2012, Printed on Jul. 6, 2017, pp. 1-5.

Packd, "Packd from Miles Pepper, Predict your day and grow your business," Video, http://packd.org/, Printed on Jul. 6, 2017, Copyright 2017 Packd, pp. 1-4.

Verizon Wireless, "New Social App Lets You See How Crowded a Place is Before You Go," Verizon Wireless Archives, http://www.verizon.com/about/news/vzw/2015/09/new-social-app-lets-you-see-how-crowded-a-place-is-before-you-go, Sep. 2, 2015, Printed on Jul. 6, 2017, pp. 1-3.

Placemeter, "Placemeter Turns Video Into Meaningful Data," http://www.placemeter.com/, Printed on Jul. 28, 2017, pp. 1-4.

IBM, List of IBM Patents or Patent Applications Treated as Related, Appendix P, dated Jun. 13, 2019, 2 pages.

Pending U.S. Appl. No. 16/402,352, filed May 3, 2019, entitled: "Parking Availability Predictor", 39 pages.

Xu et al., "Real-Time Street Parking Availability Estimation", 2013 IEEE (Year 2013), pp. 1-11.

* cited by examiner

PARKING AVAILABILITY PREDICTOR

BACKGROUND

The present invention relates generally to predictive modelling, and more particularly to predicting parking availability.

It can be difficult to find available parking in both urban and suburban environments. Navigation systems and online databases are only aware of a very limited number of parking lots and these well-known parking lots not only fill up, but frequently charge exorbitant parking rates. Interestingly, many uncatalogued parking spaces, such as on-street parking and open-air parking lots, can be found only slightly further from a given destination, often times with a higher probability of availability.

SUMMARY

Embodiments of the present invention disclose a method, a computer program product, and a computer system for a parking availability prediction. A computer identifies parking spaces and groups the parking spacing into parking locations. In addition, the computer distinguishes private parking spaces from public parking spaces, and trains a crowd forecast model for each of the parking locations. The computer further receives a destination and preferences, from which the computer creates a geofence based on the destination and preferences. The computer then predicts parking availability based on the crowd forecast models and refines the crowd forecast model.

DETAILED DESCRIPTION

The invention herein presents a solution for predicting parking availability based on a crowd forecast model that analyses human and vehicle activity.

Figure 1:
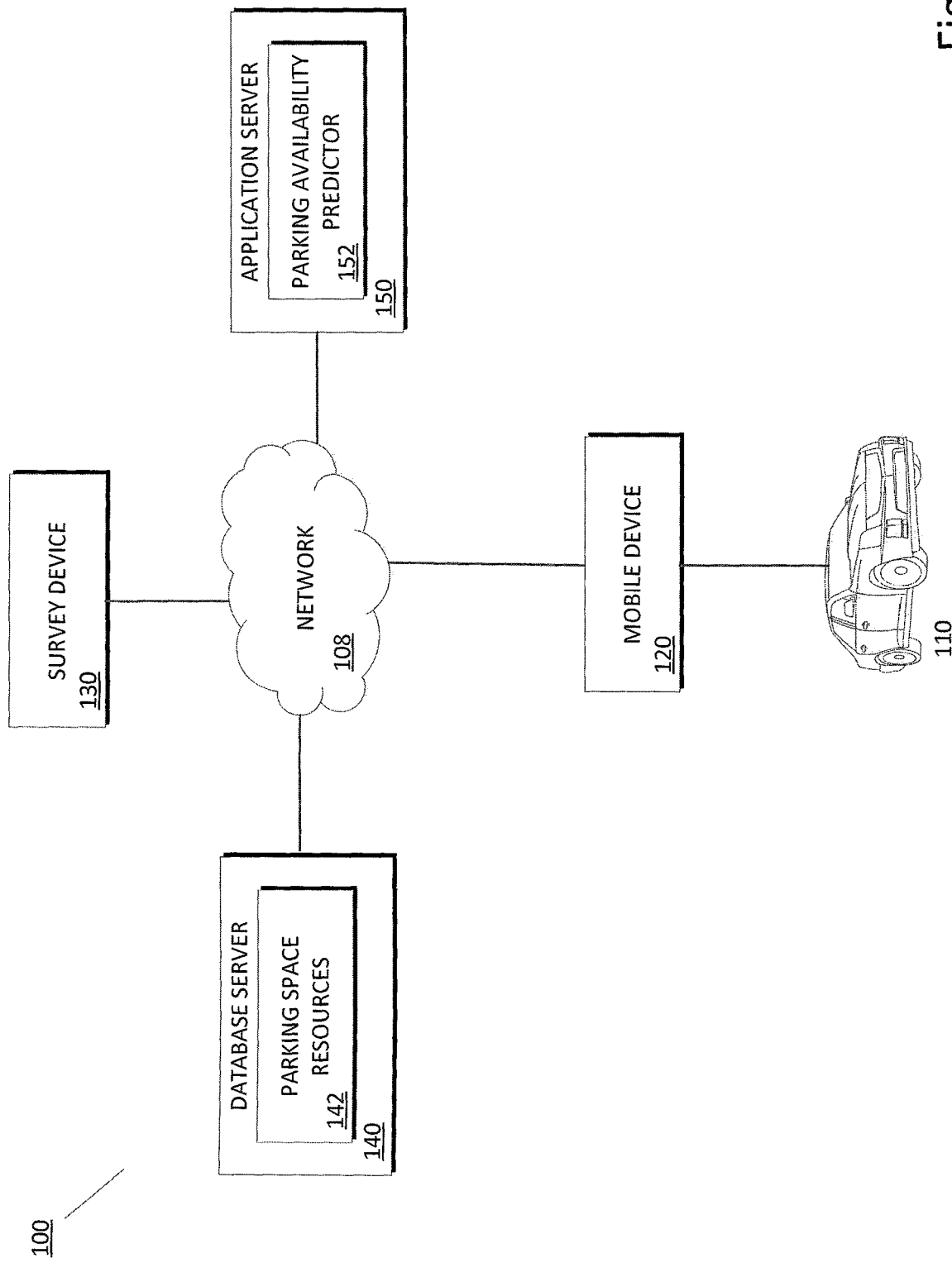
FIG. 1 depicts a schematic diagram illustrating the components of parking availability prediction system 100, in accordance with an embodiment of the present invention.

A parking availability prediction system 100 in accordance with an embodiment of the invention is illustrated by FIG. 1.

In the example embodiment, network 108 is a communication channel capable of transferring data between connected devices. In the example embodiment, network 108 may be the Internet, representing a worldwide collection of networks and gateways to support communications between devices connected to the Internet. Moreover, network 108 may include, for example, wired, wireless, or fiber optic connections which may be implemented as an intranet network, a local area network (LAN), a wide area network (WAN), or any combination thereof. In further embodiments, network 108 may be a Bluetooth network, a WiFi network, or a combination thereof. In yet further embodiments, network 108 may be a telecommunications network used to facilitate telephone calls between two or more parties comprising a landline network, a wireless network, a closed network, a satellite network, or any combination thereof. In general, network 108 can be any combination of connections and protocols that will support communications between mobile device 120, survey device 130, database server 140, and application server 150.

In the example embodiment, vehicle 110 is associated with mobile device 120 and is an automobile for which a user of mobile device 120 may be seeking available parking.

In the example embodiment, mobile device 120 is a computing device associated with vehicle 110 that is capable of communicating with connected devices via network 108. Mobile device 120 includes an integrated accelerometer module, gyroscope module, and global position system (GPS). In addition, mobile device 120 is capable of transmitting starting, ending, and precise location information of vehicle 110 which, in combination with the aforementioned modules, may be used to calculate current GPS coordinates, travel speed, travel direction, travel duration, and the like. In the example embodiment, mobile device 120 may be a laptop computer, a notebook, a tablet computer, a netbook computer, a personal computer (PC), a personal digital assistant (PDA), a smart phone, a mobile phone, a virtual device, a thin client, or any other electronic device. In other embodiments, mobile device 120 may be physically and electronically integrated with vehicle 110 and the operations performed by both components may be performed by a single entity. While in the example embodiment mobile device 120 is associated with vehicle 110, in other embodiments mobile device 120 may simply be associated with a user. In such embodiments, a user may utilize mobile device 120 to, for example, identify available parking for another individual in control of vehicle 110 or future events at which the user may control vehicle 110. Mobile device 120 is described in greater detail with reference to FIG. 3.

In the example embodiment, survey device 130 is a device used for surveying areas of land. Survey device 130 may be positioned in Earth's orbit, e.g. a satellite or spacecraft, as well as in Earth's atmosphere, e.g. a plane, drone, helicopter, balloon, etc. Alternatively, survey device 130 may be positioned on the surface of the Earth, e.g. camera mounted on a street sign, building, antenna, mountain, etc., as well as inside the Earth, for example underneath a parking space. In the example embodiment, survey device 130 includes equipment suitable for identifying parking spaces and, in some embodiments, may be capable of determining whether an identified parking space is occupied. Accordingly, survey device 130 may include hardware such as a visible light camera, infrared camera, x-ray camera, laser, audio recording equipment, electromagnet sensors, weight sensors, and the like.

Database server 140 includes parking space resources 142 and is a computing device configured to store and provide access to large amounts of data. In the example embodiment, database server 140 may be a laptop computer, a notebook, a tablet computer, a netbook computer, a personal computer (PC), a desktop computer, a personal digital assistant (PDA), a smart phone, a mobile phone, a virtual device, a thin client, or any other electronic device or computing system capable of receiving and sending data to and from other computing devices. While in the example embodiment database server 140 is stored remotely and accessed via network 108, database server 140 may be accessed locally in other embodiments. Moreover, although database server 140 is shown as a single device, in other embodiments, database server 140 may be comprised of a cluster or plurality of computing devices, working together or working separately. Database server 140 is described in more detail with reference to FIG. 3.

Parking space resources 142 is a collection of information contained in files, folders, images, videos, audio clips, and other document types from which parking space information may be extracted. In the example embodiment, parking space resources 142 is accessed via network 108 and may include informative websites, such as federal/state/municipal government websites, federal agency websites, private business websites, educational/research and institution websites, as well as repositories of data, such as repositories of satellite imagery and traffic statistics. In general, parking space resources 142 may contain any resource from which parking space and traffic information may be extracted. Accordingly, information extracted from parking space resources 142 may detail parking space locations (GPS coordinates, street intersection, mile marker, landmarks, etc.), parking space types (indoor/outdoor, street/lot, parallel/pull in, street level/multi-level), parking space sizes, parking space restrictions (e.g. handicap, permit required, customer only, maximum parking duration, street cleaning, parking ban, loading zone, etc.), parking rates, accepted methods of payment, valet options, electric charging availability, lot security, handicap accessibility, etc. In addition, information extracted from parking space resources 142 may further include relevant information regarding an immediate proximity of the parking space, such as a local parking space density, local amenities (e.g. restaurants, shopping), nearby public transportation, crime rates, etc.

Application server 150 includes parking availability predictor 152 and may be a laptop computer, a notebook, a tablet computer, a netbook computer, a personal computer (PC), a desktop computer, a personal digital assistant (PDA), a smart phone, a mobile phone, a virtual device, a thin client, or any other electronic device or computing system capable of receiving and sending data to and from other computing devices. While application server 150 is stored remotely and accessed via network 108 in the example embodiment, application server 150 may be accessed locally in other embodiments. Moreover, although application server 150 is shown as a single device, in other embodiments, application server 150 may be comprised of a cluster or plurality of computing devices, working together or working separately. Application server 150 is described in more detail with reference to FIG. 3.

In the example embodiment, parking availability predictor 152 is a computer application that is capable of identifying parking spaces and grouping the parking spaces into parking locations. Parking availability predictor 152 is further capable of distinguishing between public and private parking spaces as well as training a crowd forecast model for the parking locations. Moreover, parking availability predictor 152 is capable of receiving a destination and creating a geofence around the destination based on used preferences. Furthermore, parking availability predictor 152 is capable of identifying parking locations within the geofence and predicting which of the parking locations within the geofence is most likely to have available parking. Lastly, parking availability predictor 152 is capable of refining the crowd forecasting models corresponding to the parking locations. The operations of parking availability predictor 152 are described in greater detail with respect to FIG. 2, forthcoming.

Figure 2:
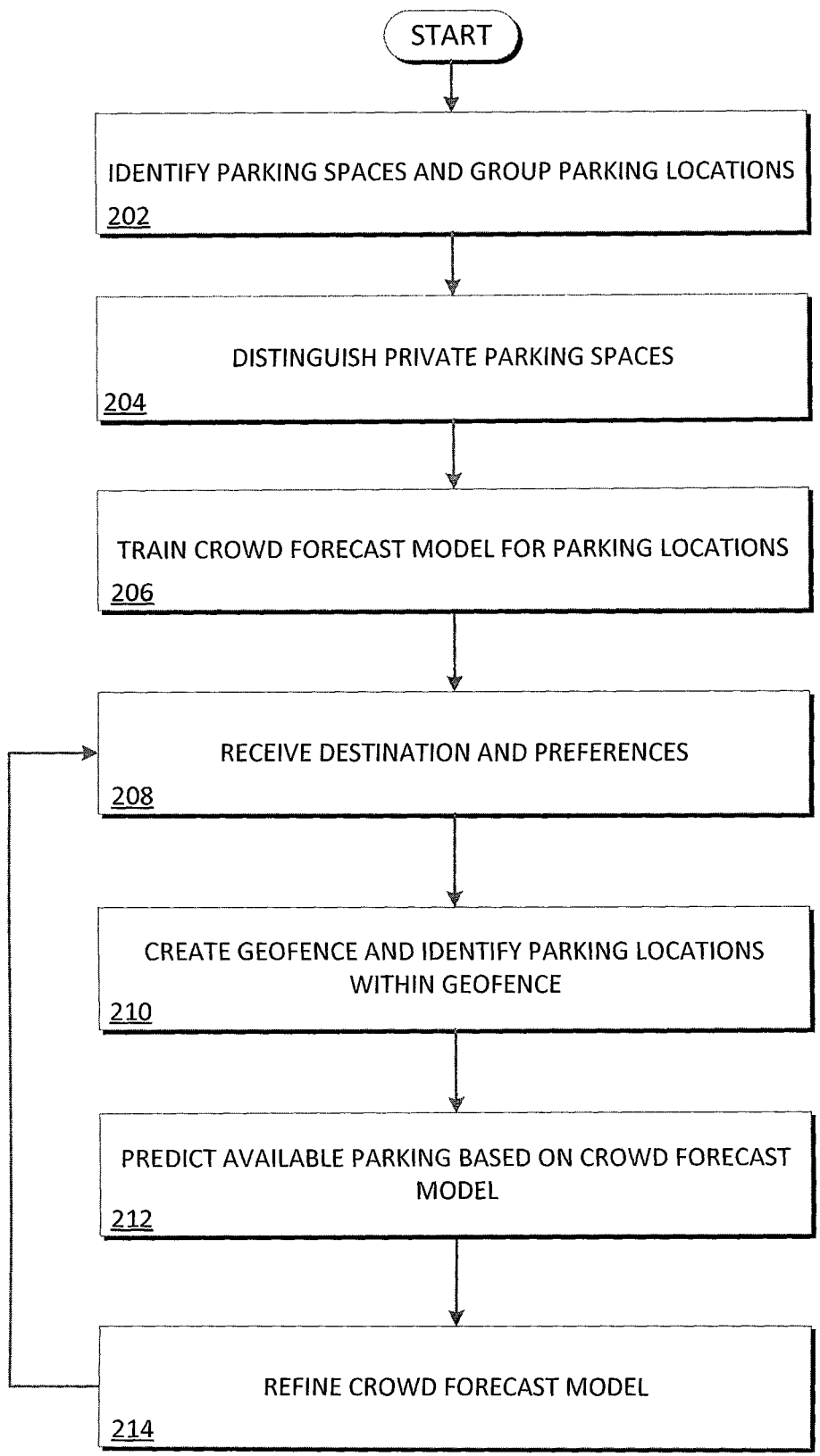
FIG. 2 depicts a flowchart illustrating the operations of parking availability predictor 152 of parking availability prediction system 100 in training crowd forecast models to predict parking availability, in accordance with an embodiment of the present invention.

FIG. 2 depicts a diagram illustrating the operations of parking availability predictor 152 in training crowd forecast models to predict parking availability, in accordance with an embodiment of the present invention.

Parking availability predictor 152 identifies parking spaces and groups the identified parking spaces into parking locations (step 202). In the example embodiment, parking availability predictor 152 identifies parking spaces through various data analysis and image processing techniques. Because parking spaces can be both indoor/outdoor and above/below ground, it will be appreciated that some of the methods used to identify parking spaces herein are more effective at identifying particular parking spaces than others. In the example embodiment, one method for identifying parking spaces involves performing image analytics to imagery provided by survey device 130 or parking space resources 142 for features indicative of parking spaces.

Such image analytics may include image recognition, pattern recognition, template matching, anisotropic diffusion, Hidden Markov models, independent component analysis, linear filtering, neural networks, partial differential equations, pixilation, and other techniques in the field of endeavour (step 202 continued). Using the aforementioned techniques, parking availability predictor 152 processes imagery for features indicative of parking spaces. For example, parking availability predictor 152 may be configured to analyse imagery for long stretches of dark pixels that resemble roadways and square/rectangular areas of dark pixels that resemble paved lots. Moreover, upon finding a dark stretch or rectangle of pavement, parking availability predictor 152 may be further configured to recognize parking spaces by searching the imagery for parking space lines (three square sides of a rectangle in white/yellow) or the reflective glare of a windshield on a vehicle that has not moved for a threshold amount of time. Such analysis is particularly useful for identifying open-air and street parking spaces, and is additionally useful when coupled with optical character recognition and natural language processing (NLP) techniques for identification of indoor and below-ground parking lots. For example, parking availability predictor 152 may search street view imagery to identify advertisements and signs for an underground or first floor parking garage which may not be visibly apparent from imagery alone.

Parking availability predictor 152 further identifies parking spaces by referencing parking space resources 142 for public information regarding parking spaces and lots (step 202 continued). Such information may include text, images, video, audio, etc. and is commonly made available by websites of public and private entities, including those of city, state, and federal government/agencies, traffic and highway associations, public transportation agencies, public/private businesses, commercial parking lots, theatres, real estate listings, research and educational institutions, and other online resources. In the example embodiment, parking availability predictor 152 applies data analysis techniques such as natural language processing (NLP) and parse trees in order to derive parking spot locations from information contained in parking space resources 142. For example, parking availability predictor 152 may analyse a city website to identify metered parking adjacent to a town hall and free parking adjacent to a public library. In addition, parking availability predictor 152 may further reference the website of a shopping plaza to identify a paid parking garage and a federal highway and traffic agency website to identify a park and ride lot.

Moreover, parking availability predictor 152 may be further configured to identify parking through crowdsourcing techniques (step 202 continued). In such embodiments, parking availability predictor 152 may be configured to retrieve and/or receive user information corresponding to a large user base via mobile device 120 having the described herein parking availability predictor 152. For example, users may be asked to select a button when arriving at or leaving a parking space, at which point parking availability predictor 152 notes the GPS location of mobile device 120. In addition, parking availability predictor 152 may utilize mobile device 120 tracking methods, described with greater detail below, to determine when mobile device 120 no longer shows signs of traveling within vehicle 110 or has just begun to show signs of traveling within vehicle 110.

When applicable, parking availability predictor 152 may be further configured to verify a potential parking space through use of alternative analytics (step 202 continued). For example, parking availability predictor 152 may be configured to verify a potential parking space identified via image analysis with a subsequent online resource search of the corresponding location. Moreover, parking availability predictor 152 may be configured to periodically verify the accuracy of previously identified parking spaces to account for changes in environment and setting, for example construction or demolition of buildings and roadways.

In addition to identifying parking spaces, parking availability predictor 152 further groups parking spaces into parking locations using the data and image analytics described above (step 202 continued). In the example embodiment, parking locations comprise one or more identified parking spaces and may include, for example, a block of parallel parking, an entire outdoor parking lot, or a floor of a parking garage. Factors used in identifying parking locations include, for example, a proximity of the parking spaces (adjacent, across, above, etc.), a site of the parking spaces (lot, garage, street), and the parking space rate (free, paid, etc.).

Parking availability predictor 152 distinguishes private parking spaces within the identified parking spaces (step 204). As used herein, public parking spaces are to be distinguished from private parking spaces based on a lack of authority needed for use, such as a permit sticker or badge to open the gate to a garage. In the example embodiment, parking availability predictor 152 determines whether an identified parking space is private through data analysis and image processing techniques similar to those described above. For example, data analysis techniques such as keyword searching may be applied to information retrieved from survey device 130 and parking space resources 142 to identify terms such as "public" and "free" while NLP techniques may be applied to determine that a particular lot is public and free after work hours. In addition, parking availability predictor 152 applies image analysis techniques such as template matching and pattern recognition to the identified parking spaces to determine whether a potential parking spot is adjacent to a particular type of building and, if so, determine the type of building. If the identified parking space is adjacent to a single family home or garage, e.g. a driveway, the identified parking space is likely private. Alternatively, if the identified parking spot is adjacent to a skyscraper building or restaurant, the identified parking spot is likely public (unless is it reserved for valet, in which case data analysis of a corresponding website would indicate such). In other cases, however, building type may not be as indicative. For example, condominiums and apartment buildings may have adjacent public or private parking. In such cases, image analysis techniques enumerated above may be used to identify parking space numbers, parking signs, and the like. For example, parking space numbers are generally indicative of reserved parking while blank spaces or spaces marked "visitor" may be public. In addition, analysis of parking signs may indicate whether parking is prohibited at certain hours, for example no more than two hours during business hours or on days having street cleaning. Moreover, parking availability predictor 152 may determine whether a same vehicle parks in a same parking space of a full parking lot a majority or all of the time, and therefore infer that a parking space is private. Furthermore, parking availability predictor 152 may apply data analysis techniques to identify a parking policy detailed by a corresponding realtor or condominium website, parking ordinances of the particular city/town, or other information of parking space resources 142. In other cases, alternative analysis techniques may be employed.

Other techniques for determining whether an identified parking space is private includes crowdsourcing techniques similar to those above wherein parking availability predictor 152 receives user information via mobile device 120. For example, crowdsourcing may simply ask users whether a particular parking space is public or private. A similar method can be used in situations where parking availability predictor 152 is incapable of determining whether a space is private or to verify previously determined publicity of an identified parking space. After identifying private parking spaces, parking availability predictor 152 determines whether the identified private spaces should be accounted for in the crowd forecast models. In some embodiments, users may rent or sell private parking spaces or locations to third parties. For example, a user living in the city without vehicle 110 may rent out a parking space that comes with their apartment or a business may rent a private parking lot to an adjacent restaurant on weekends. In such embodiments, parking availability predictor 152 may be further configured to, upon receiving user input indicating that a parking space is private, query whether the user is authorized and willing to rent the private parking space and, if so, at what rates and times. The private parking space may then be incorporated into the crowd forecast models at times of availability and for users who indicate they are willing to pay the corresponding rate (if any) in user preferences, received above.

Parking availability predictor 152 trains a crowd forecast model for the parking locations through supervised machine learning (step 206). In the example embodiment, the crowd forecast model is based on tracking a large base of both human and vehicle activity at the parking locations over time. Parking availability predictor 152 tracks the large base of humans by determining a number of mobile devices 120 that are present within the parking locations via the integrated GPS at periodic times throughout a day, week, and year. This measurement gives parking availability predictor 152 a rough estimate of a relative amount of users within a particular parking location at any given time that can be normalized as more and more data is collected to reflect changes in user base and user migration.

In addition, parking availability predictor 152 further trains the crowd forecast model based on an amount of vehicles 110 parked at the parking locations (step 206 continued). In the example embodiment, parking availability predictor 152 references the integrated GPS, accelerometer, and gyroscope modules of mobile devices 120 to determine whether mobile device 120 exhibits characteristics of vehicle 110 movement. Based on determining when mobile device 120 ceases to exhibit characteristics of vehicle movement, parking availability predictor 152 determines that vehicle 110 has parked and vice versa. For example, parking availability predictor 152 analyses a maximum, average, or minimum speed of mobile device 120 to determine whether the exhibited movement is that of a typical (or specific) user or a typical vehicle 110. Similarly, parking availability predictor 152 continuously analyses the location of mobile device 120 to determine whether mobile device 120 is following streets, i.e. indicating vehicle movement, or traveling through parks and through buildings, i.e. indicating on foot movement. Moreover, parking availability predictor 152 continuously analyses an acceleration of mobile device 120 (e.g. speeding up, turning, slowing down) to determine whether the acceleration is that of a typical vehicle or user on foot. Similar to determining how many users are within a parking location above, parking availability predictor 152 estimates an amount of vehicles within the parking location based on analysing the movements of movie device 120 above. In some embodiments, parking availability predictor 152 may verify that the location at which vehicle 110 movement characteristics begin again is substantially similar, or within a threshold distance, of the location at which the vehicle movement characteristics stopped in order to verify that vehicle 110 was parked at the same location. Based on a determined amount of users and vehicles at each parking location over time, parking availability predictor 152 generates a model for each of the parking locations.

Using the analysis above, parking availability predictor 152 is capable of determining relevant parking space statistics of each parking location at all times, such as relative parking occupancy, parking frequency, parking start time, parking end time, parking duration, and the like (step 206 continued). It is worth noting that this inference is not applicable to public transportation vehicles which, counter to the inference above, do not park in a parking space after mobile device 120 has exited the vehicle. Thus, in order to differentiate between mobile device 120 exiting a parked vehicle 110 and mobile device 120 exiting a mode of public transportation, parking availability predictor 152 cross references the location and movement of mobile device 120 with registered transportation vehicles, e.g. buses and taxis, which are often tracked already by cities and private businesses. If the location and movement of mobile device 120 matches the location and movement of public transportation, parking availability predictor 152 may not use the corresponding data to train the crowd forecast model.

In training the crowd forecast model, such human and vehicle activity is considered along with the amount of parking spaces identified at each parking location such that parking availability predictor 152 is capable of estimating how many parking spaces of a particular parking location are in use (step 206 continued). This feature is particularly useful for predicting parking availability not only in real time, but for future trips based on previous trends at similar times of day/week/year. Note that in embodiments where private parking is determined available for free or rent, as discussed above, parking availability predictor 152 may further consider such private parking spaces and locations as well in training and using the crowd forecast model. In the example embodiment, the model is refined by continuously recording new activity data and normalizing the data. Moreover, parking availability predictor 152 may further verify model accuracy periodically by crowdsourcing answers from users of parking availability predictor 152 through, for example, user location verification. In addition to tracking human and vehicle 110 activity, the crowd forecast model may further take into account other factors such as traffic trends in the vicinity of the point of interest. Using similar data and image processing methods as described above, parking availability predictor 152 may measure traffic trends based on a volume of vehicles within the proximity of the parking location as measured by survey device 130 or detailed by parking space resources 142. Moreover, parking availability predictor 152 may be further configured to factor in events, such as sporting events or parades, via natural language processing of information contained in parking space resources 142. Overall, parking availability predictor 152 may be configured to factor in any feature relevant to parking availability, including weather, construction, tourism, and the like when training the crowd forecast model. In the example embodiment, all of the aforementioned data collected by parking availability predictor is used to train a supervised machine learning model that predicts the occupancy of a given parking location at a given time.

Parking availability predictor 152 receives a destination and user preferences (step 208). In the example embodiment, parking availability predictor 152 receives a destination from a user via mobile device 120 that is representative of a location the user wishes to park vehicle 110. In addition, parking availability predictor 152 may further receive a starting point, a starting time, and an intended arrival time such that parking availability predictor 152 is capable of providing future parking availability predictions. Moreover, the user input may further include user preferences including a distance a user is willing to park from the destination, a rate the user will pay, indoor/outdoor parking, street/lot parking, accommodations such as handicap accessibility or electric charging, and any other user preferences relevant to parking.

Parking availability predictor 152 creates a geofence and identifies parking locations within the geofence (step 210). In the example embodiment, a geofence is an area in which to identify potential parking locations suitable for the received destination and user preferences. In the example embodiment, geofences are created to identify boundaries of a given destination based on, for example, a distance a user is willing to walk to the received destination or physical features of the destination. For example, the geofence may simply encompass a circle having a set radius, or threshold distance, from the destination. Alternatively, if the received destination is on the beach, parking availability predictor 152 may create a geofence that disregards parts of ocean and beach. Based on the created geofence and user preferences, parking availability predictor 152 identifies geofence-encompassed parking locations which match the preferences of the user, for example only returning free or indoor parking locations. Moreover, such preferences may be evaluated and weighed such that an optimal parking location, aside from available parking spaces, is selected for each user. For example, if a user would prefer to walk a greater distance to the point of interest on a nice day than pay extra for a parking location in closer proximity to the point of interest, such a preference may be indicated and weighed accordingly by parking availability predictor 152.

Parking availability predictor 152 predicts parking locations likely to have available parking based on the crowd forecast models (step 212). In the example embodiment, parking availability predictor 152 compares a time at which parking is requested with the crowd forecast models of the identified parking locations. By referencing historic crowd source models, parking availability predictor 152 is capable of predicting available parking both immediately and corresponding to future times without relying on real-time data that is difficult to ascertain for data, reception, privacy, and other reasons. Parking availability predictor 152 then determines which of the identified parking lots are likely to have available parking based on the models. Because a geofence may include one or more parking locations, parking availability predictor 152 may be configured to rank the parking locations based on a probability of having available parking. In other embodiments, parking availability predictor 152 may be configured to base the aforementioned ranking on not just on chances of available parking, but also on other user preference factors or a use profile. For example, the ranked parking locations may provide options for filtering free parking lots, shaded parking lots, and other user preferences that were not taken into account when identifying parking location within the geofence (perhaps these factors were no deal-breakers and thus were not entered as parking location criteria).

In addition, parking availability predictor 152 may be further configured to notify users, via mobile device 120, of newly available parking locations in real time (step 212 continued). For example, if it is a determined that a user has not yet arrived at a parking location and a crowd forecast model indicates that, since requesting parking availability earlier, another parking lot has subsequently increased chances of available parking, then parking availability predictor 152 may push notify the user of the improved chances of availability at the new parking location. Such real-time notifications may be made with similar regard to not only increased chances of parking availability, but also free parking locations that open up and those which are closer to the destination. Parking availability predictor 152 may additionally allot a user receiving one of the aforementioned push notifications a specified time to reach the parking location based on their current location and, after which the specified time has lapsed and it is determined that the user has not parked at the parking location, pass the recommendation on to a new user seeking to park in a similar or same geofence.

Parking availability predictor 152 refines the crowd forecast model (step 214). In the example embodiment, parking availability predictor 152 refines the crowd forecast model by continuously taking and normalizing measurements at periodic intervals for each parking location. In addition, parking availability predictor 152 may be further configured to subsequently verify the accuracy of the predictions. For example, after providing a parking location prediction, parking availability predictor 152 may apply similar GPS and accelerometer measurement analysis techniques as above to determine whether the user in fact parked vehicle 110 at the predicted parking location. In addition, verification information can be crowdsourced from users by message or push notification asking for affirmation of whether a parking space was available at the predicted parking location.

Figure 3:
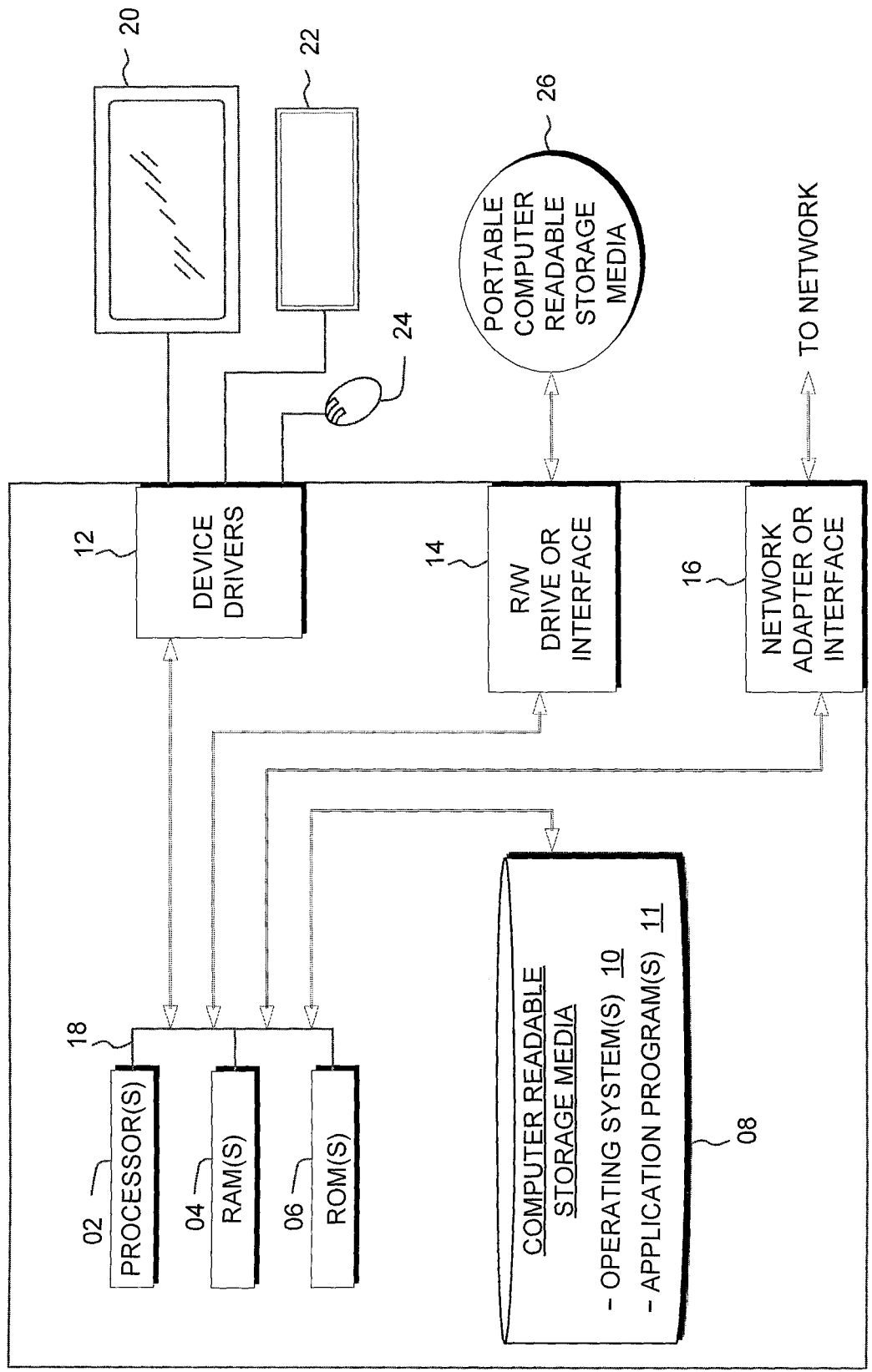
FIG. 3 is a block diagram depicting the hardware components of parking availability prediction system 100 of FIG. 1, in accordance with an embodiment of the present invention.

FIG. 3 depicts a block diagram of computing devices utilized by parking availability prediction system 100 of FIG. 1, in accordance with an embodiment of the present invention. It should be appreciated that FIG. 7 provides only an illustration of one implementation and does not imply any limitations with regard to the environments in which different embodiments may be implemented. Many modifications to the depicted environment may be made.

Mobile device 120 may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11, for example parking availability predictor 152, are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Mobile device 120 may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Mobile device 120 may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Mobile device 120 may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
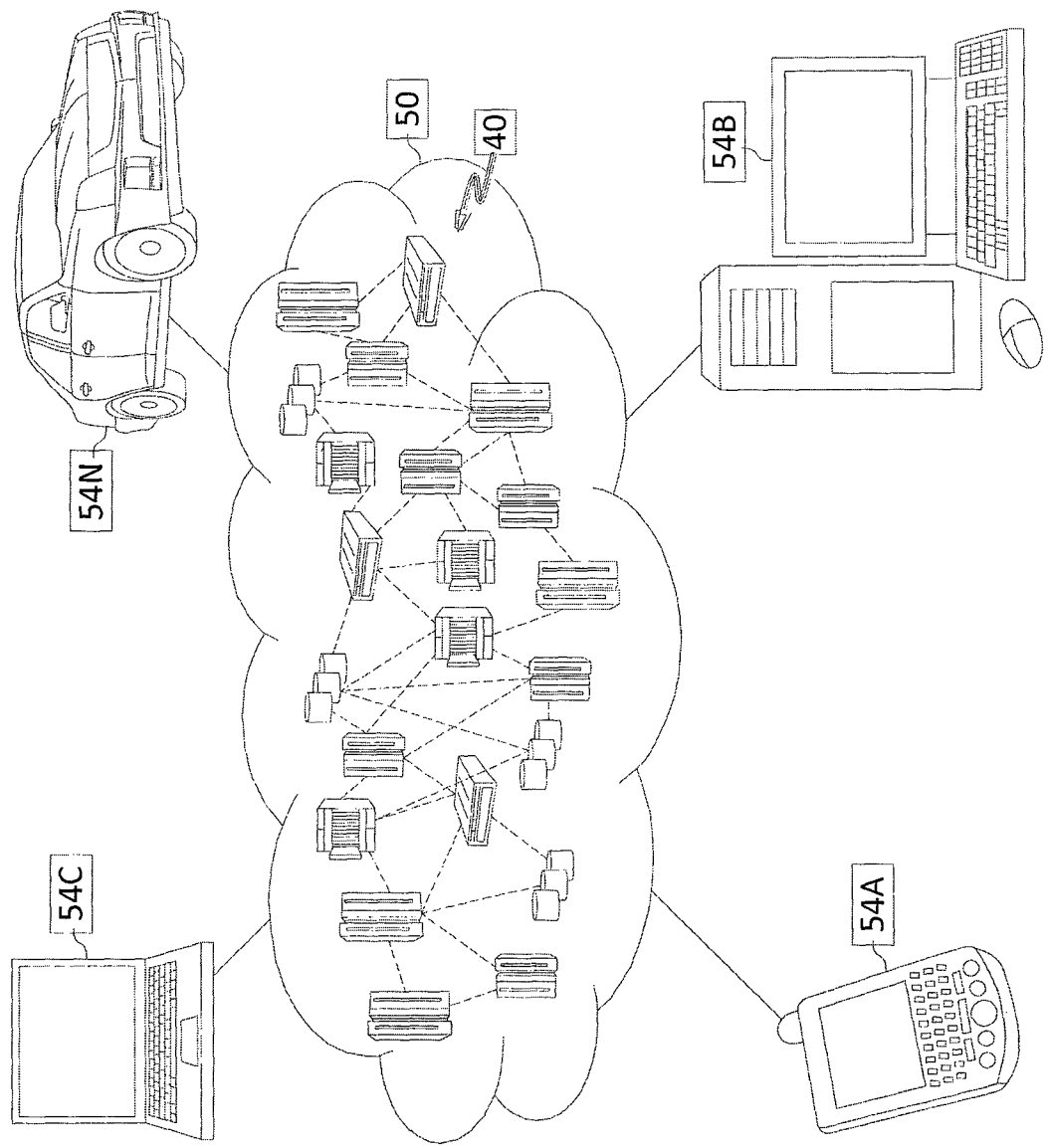
FIG. 4 depicts a cloud computing environment, in accordance with an embodiment of the present invention.

Referring now to FIG. 4, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer MB, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 40 and cloud computing environment 50 can communicate with any type of computerized device over any type of network and/or network addressable connection (e.g., using a web browser).

Figure 5:
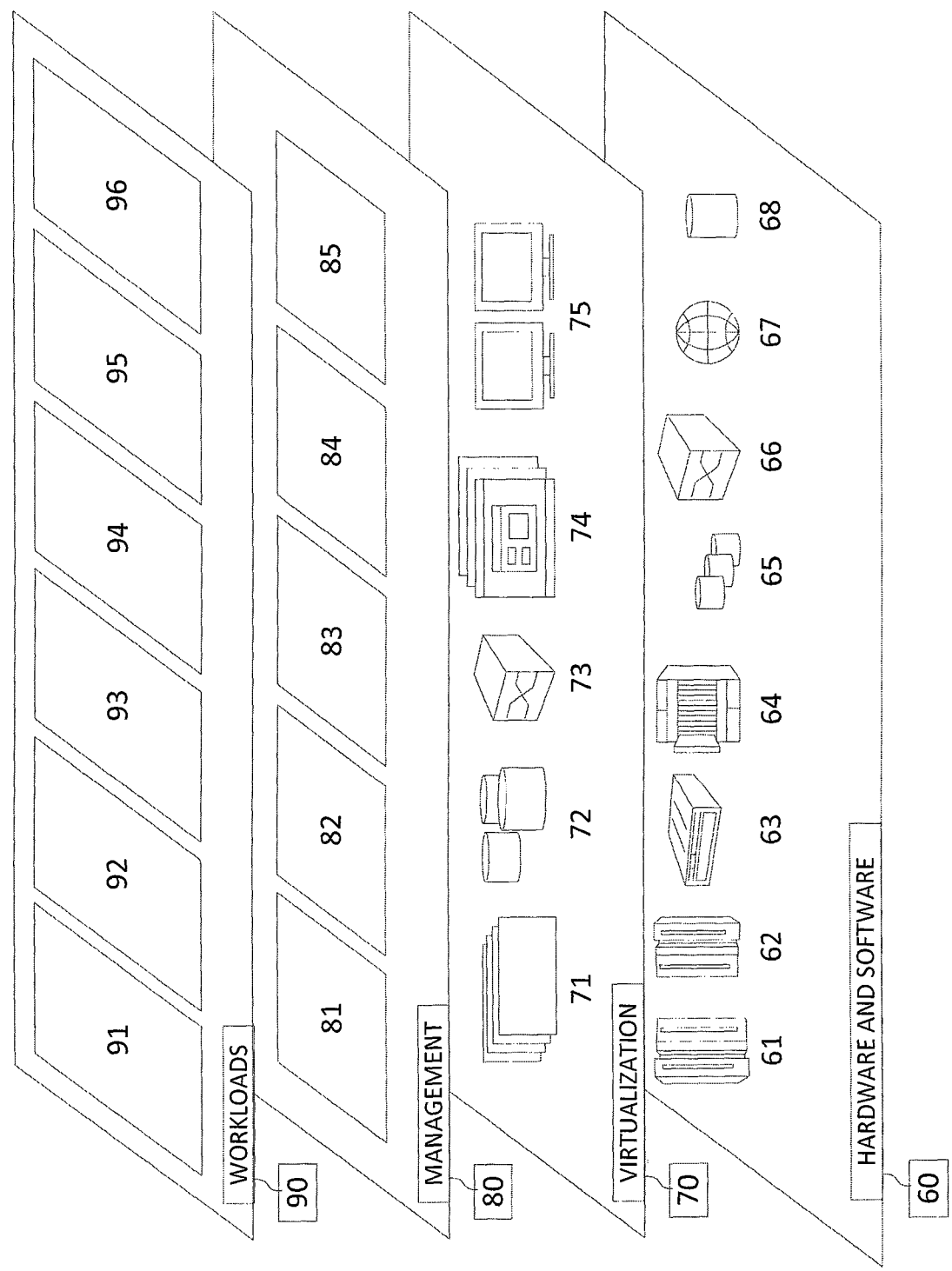
FIG. 5 depicts abstraction model layers, in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components.

Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and parking availability processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer program product for predicting parking availability, the computer program product comprising:
   one or more computer-readable storage media and program instructions stored on the one or more computer-readable storage media, the program instructions comprising:
   program instructions to receive a destination and one or more user preferences, wherein the user preferences includes electric vehicle charging availability;
   program instructions to identify one or more parking locations within a threshold distance of the destination;
   program instructions to identify one or more electric vehicle charging stations within the one or more parking locations;
   program instructions to identify parking availability features in an image of a parking location taken by an extra-vehicular survey device by using image analytics and natural language processing, wherein the parking availability features include parking relevant text and characteristics of parking spots;
   program instructions to train, using machine learning and training data, a crowd forecast model that correlates a number of mobile devices and a number of vehicles with a number of parking spaces, wherein the crowd forecast model incorporates the user preferences and the identified parking availability features; and
   program instructions to predict parking availability at the one or more parking locations based on applying the crowd forecast model, wherein the crowd forecast model identifies, determines, and predicts an occupancy of the one or more parking locations based on at least one of accelerometer, gyroscope, and GPS data of one or more mobile devices indicating that the one or more mobile devices have started or stopped motion within a vehicle.

2. The computer program product of claim 1, wherein the program instructions to identify the one or more parking locations within the threshold distance of the destination is based on the one or more user preferences.

3. The computer program product of claim 1, wherein for a parking location of the one or more parking locations, the crowd forecast model correlates a number of mobile devices and a number of vehicles with a number of parking spaces.

4. The computer program product of claim 3, wherein the number of mobile devices is determined by program instructions to compare locations of one or more mobile devices with a location corresponding to the parking location.

5. The computer program product of claim 3, wherein the program instructions to determine the occupancy of the one or more parking locations is based on the at least one of accelerometer, gyroscope, and GPS data of one or more mobile devices indicating that the one or more mobile devices have started or stopped motion within a vehicle within a threshold distance of the one or more parking locations.

6. The computer program product of claim 3, wherein the number of available parking spaces is determined by at least one of:
   program instructions to apply image and data processing techniques to one or more online resources detailing the parking location for references made to parking; and
   program instructions to apply data processing techniques to information retrieved from one or more mobile devices determined to be within the parking location.

7. The computer program product of claim 1, further comprising:
   program instructions to refine, the crowd forecast model by verifying the predicted parking availability through determining whether features indicative of vehicle movement exhibited by a mobile device associated with the received destination stop in the parking location.

8. A computer system for predicting parking availability, the computer system comprising:
   one or more computer processors, one or more computer-readable storage media, and program instructions stored on one or more of the computer-readable storage media for execution by at least one of the one or more processors, the program instructions comprising:
   program instructions to receive a destination and one or more user preferences, wherein the user preferences includes electric vehicle charging availability;
   program instructions to identify one or more parking locations within a threshold distance of the destination;
   program instructions to identify one or more electric vehicle charging stations within the one or more parking locations;
   identifying parking availability features in an image of a parking location taken by an extra-vehicular survey device by using image analytics and natural language processing, wherein the parking availability features include parking relevant text and characteristics of parking spots;
   program instructions to train, using machine learning and training data, a crowd forecast model that correlates a number of mobile devices and a number of vehicles with a number of parking spaces, wherein the crowd forecast model incorporates the user preferences and the identified parking availability features; and
   program instructions to predict parking availability at the one or more parking locations based on applying the crowd forecast model, wherein the crowd forecast model identifies, determines, and predicts an occupancy of the one or more parking locations based on at least one of accelerometer, gyroscope, and GPS data of one or more mobile devices indicating that the one or more mobile devices have started or stopped motion within a vehicle.

9. The computer system of claim 8, wherein the program instructions to identify the one or more parking locations within the threshold distance of the destination is based on the one or more user preferences.

10. The computer program product of claim 8, wherein for a parking location of the one or more parking locations, the crowd forecast model correlates a number of mobile devices and a number of vehicles with a number of parking spaces.

11. The computer system of claim 10, wherein the number of mobile devices is determined by program instructions to compare locations of one or more mobile devices with a location corresponding to the parking location.

12. The computer system of claim 10, wherein the program instructions to determine the occupancy of the one or more parking locations is based on the at least one of accelerometer, gyroscope, and GPS data of one or more mobile devices indicating that the one or more mobile devices have started or stopped motion within a vehicle within a threshold distance of the one or more parking locations.

13. The computer system of claim 10, wherein the number of available parking spaces is determined by at least one of:
   program instructions to apply image and data processing techniques to one or more online resources detailing the parking location for references made to parking; and
   program instructions to apply data processing techniques to information retrieved from one or more mobile devices determined to be within the parking location.

\* \* \* \* \*